(12) United States Patent
Rosen

(10) Patent No.: US 9,736,996 B2
(45) Date of Patent: Aug. 22, 2017

(54) PROCESSES AND APPARATUS FOR REDUCING THE INTENSITY OF TROPICAL CYCLONES

(75) Inventor: Alfred Rosen, Palm Beach, FL (US)

(73) Assignees: Robert M. Rosen, Edwards, CO (US); David B. Rosen, Lexington, MA (US)

( * ) Notice: Subject to any disclaimer, the term of this patent is extended or adjusted under 35 U.S.C. 154(b) by 1838 days.

(21) Appl. No.: 12/612,830

(22) Filed: Nov. 5, 2009

(65) Prior Publication Data

US 2010/0051714 A1    Mar. 4, 2010

Related U.S. Application Data

(63) Continuation-in-part of application No. 12/141,161, filed on Jun. 18, 2008, now Pat. No. 8,161,757.

(Continued)

(51) Int. Cl.
*A01G 15/00*    (2006.01)
*B05B 12/12*    (2006.01)
(Continued)

(52) U.S. Cl.
CPC .............. *A01G 15/00* (2013.01); *B05B 12/12* (2013.01); *B05B 17/04* (2013.01); *B63B 25/08* (2013.01); *B63B 35/4413* (2013.01); *B63B 2211/00* (2013.01); *B63B 2213/02* (2013.01); *F25C 3/04* (2013.01)

(58) Field of Classification Search
CPC ........... A01G 15/00; F25C 3/04; B05B 12/00; B05B 12/12; B05B 12/18; B05B 17/00; B05B 17/04; B63B 25/08; B63B 35/44; B63B 35/4413; B63B 2211/00; B63B 2213/02

USPC ........ 60/641.6, 641.7; 210/138, 170.11, 747, 210/747.5; 239/2.1, 2.2, 14.1, 14.2; 114/144 R, 244, 264–267, 382; 440/1, 2, 440/8–10; 441/1–3
See application file for complete search history.

(56) References Cited

U.S. PATENT DOCUMENTS 2,698,431 A    12/1954 Bielinski
2,927,435 A  * 3/1960 Upson ........................... 405/227
(Continued)

FOREIGN PATENT DOCUMENTS

WO    WO 2006/085830    8/2006    ............. A01G 15/00

OTHER PUBLICATIONS

Pelc et al, "Renewable energy from the ocean", Marine Policy vol. 26, (2002), pp. 471-479.*
(Continued)

*Primary Examiner* — Joseph Drodge
(74) *Attorney, Agent, or Firm* — Nixon Peabody LLP

(57) ABSTRACT

A procedure for moderating the intensity of a hurricane in regions of the seas that are host to the oil and gas industries is described, using the Gulf of Mexico as an example of such a region, and snow-making machines as the instruments for carrying out the procedure. These machines are carried on moving platforms that follow the hurricane and on fixed platforms that are located in the path of the hurricane. In the described procedure snow-making machines are installed on fixed platforms throughout the region, and only those machines that are in the path of an approaching hurricane are turned on, while the snow-making machines on the moving platform(s) are operating continually.

9 Claims, 3 Drawing Sheets

Related U.S. Application Data

(60) Provisional application No. 61/112,500, filed on Nov. 7, 2008, provisional application No. 60/958,777, filed on Jul. 9, 2007.

(51) Int. Cl.
  *B05B 17/04* (2006.01)
  *B63B 25/08* (2006.01)
  *B63B 35/44* (2006.01)
  *F25C 3/04* (2006.01)

(56) References Cited

U.S. PATENT DOCUMENTS

| | | | |
|---|---|---|---|
| 3,762,176 A * | 10/1973 | Coggins, Jr. | 62/74 |
| 4,356,094 A * | 10/1982 | Ross | 210/774 |
| 4,674,918 A * | 6/1987 | Kalpins | 405/224 |
| 4,813,598 A * | 3/1989 | Kosik et al. | 239/2.2 |
| 5,556,029 A | 9/1996 | Griese | |
| 6,315,213 B1 | 11/2001 | Cordani | |
| 6,684,648 B2 | 2/2004 | Faqih | |
| 6,845,919 B1 | 1/2005 | Hogue | |
| 7,520,237 B1 * | 4/2009 | Dimov Zhekov | 114/264 |
| 7,536,967 B2 * | 5/2009 | Barber | 114/144 R |
| 2002/0008155 A1 | 1/2002 | Uram | |
| 2003/0085296 A1 | 5/2003 | Waxmanski | |
| 2003/0173414 A1 | 9/2003 | Herpay | |
| 2005/0031417 A1 * | 2/2005 | Hofer et al. | 405/52 |
| 2005/0133612 A1 | 6/2005 | Uram | |
| 2007/0114298 A1 | 5/2007 | O'Keefe | |
| 2007/0158449 A1 * | 7/2007 | Hoffmann et al. | 239/2.1 |
| 2007/0257126 A1 * | 11/2007 | Vondracek | 239/2.1 |
| 2007/0270057 A1 * | 11/2007 | Feldman et al. | 441/1 |
| 2007/0283866 A1 * | 12/2007 | Veazey | B63B 3/04 114/77 R |
| 2008/0023566 A1 * | 1/2008 | Solc | 239/2.1 |
| 2008/0175669 A1 | 7/2008 | Kleysen | |
| 2008/0277492 A1 * | 11/2008 | Cannon | 239/14.1 |
| 2009/0008468 A1 | 1/2009 | Skukan | |
| 2009/0173386 A1 | 7/2009 | Bowers et al. | |
| 2009/0173404 A1 | 7/2009 | Bowers et al. | |
| 2009/0173801 A1 | 7/2009 | Bowers et al. | |
| 2009/0175685 A1 | 7/2009 | Bowers et al. | |
| 2009/0177569 A1 | 7/2009 | Bowers et al. | |
| 2011/0101124 A1 * | 5/2011 | Roberts | A01G 15/00 239/14.1 |
| 2011/0168797 A1 * | 7/2011 | Neymeyer | A01G 15/00 239/2.1 |
| 2011/0204159 A1 * | 8/2011 | Rogers | B64G 1/428 239/14.1 |
| 2011/0284649 A1 * | 11/2011 | Crawford | A01G 15/00 239/2.1 |

OTHER PUBLICATIONS

Salicido, "Offshore Federalism and Ocean Industrialization", 82 Tulane Law Review, (2007-2008 Volume), p. 1355.*
Salicido, "Offshore Federalism and Ocean Industrialization", 82 Tulane Law Review, (2007-2008 Volume), p. 1356.*
Salicido, "Offshore Federalism and Ocean Industrialization", 82 Tulane Law Review, (2007-2008 Volume), p. 1361.*

* cited by examiner

PROCESSES AND APPARATUS FOR REDUCING THE INTENSITY OF TROPICAL CYCLONES

CROSS REFERENCE TO RELATED APPLICATIONS

This application is a continuation-in-part of U.S. application Ser. No. 12/141,161 filed Jun. 18, 2008, now U.S. Pat. No. 8,161,757, and claims priority from U.S. Provisional Application Ser. Nos. 60/958,777, filed Jul. 9, 2007, and said application is a continuation-in-part of 61/112,500, filed Nov. 7, 2008, all of which are hereby incorporated by reference in their entirety and from which priority is claimed.

BACKGROUND OF THE INVENTION

This invention teaches to use artificial snow to suppress moisture rising from warm surface water into storm clouds that are capable of producing tropical cyclones, aided if desired by the use of subsurface water to lower the temperature of surface water below the temperature that favors the production of tropical cyclones. An embodiment of the invention is disclosed in the drawings that accompany this application and the description of those drawings that follows. A ship that facilitates the use, maintenance and uninterrupted operation of snow-making and water delivery equipment under storm-at-sea conditions is disclosed.

My pending U.S. application Ser. No. 12/141,161, filed Jun. 18, 2008, teaches to use artificial snow to suppress moisture rising from warm surface water into storm clouds that are capable of producing tropical cyclones. That application discloses to use moving platforms (i.e., ships) carrying artificial snow making devices in the eye of a tropical cyclone. My present invention proposes to augment the benefits of those moving platforms with additional artificial snow making devices located on fixed platforms that may be located in ocean waters in the path of an oncoming tropical cyclone.

SUMMARY OF THE INVENTION

In one embodiment, a navigable vessel for use in reducing the intensity of a tropical cyclone having an eye located over an ocean comprises a plurality of artificial snow-making devices aboard the vessel, at least one pump coupled to the devices and accessible to a body of water in which the vessel is floating for supplying the devices with water for making artificial snow, and a power source coupled to the devices to operate the devices in concert for producing a substantially uninterrupted supply of artificial snow. The artificial snow-making devices have discharge nozzles oriented to project the artificial snow away from the vessel onto or above the water adjacent the vessel. In one implementation, multiple vessels equipped with artificial snow-making devices are positioned in a region of the ocean directly beneath the eye, and multiple streams of artificial snow are directed onto or above the ocean water located directly beneath the eye of the cyclone.

In another embodiment, the intensity of a tropical cyclone having an eye located over an ocean with water vapor formed above the ocean water located directly beneath the eye is reduced by producing at least one stream of artificial snow and directing said stream into the water vapor above the ocean water located directly beneath the eye. In one implementation, multiple streams of artificial snow are directed onto or above the ocean water located directly beneath the eye of the cyclone.

A hurricane that enters the Gulf of Mexico as a Category 1 or 2 storm may increase its intensity to as much as Category 3 or 4 before making landfall, owing to the presence of surface-water temperatures that are typically in excess of 80 degrees F. Unlike deep ocean waters, this Gulf is home to numerous fixed platforms engaged in oil and gas underwater drilling, a condition which may soon prevail elsewhere in Continental Shelf regions. This invention takes advantage of the probability that some of those fixed platforms may be in the path of an oncoming hurricane, proposing accordingly to fit the fixed platforms with artificial snow-making devices, to supplement the efforts of the moving platforms wherever possible. The fixed platforms may each be fitted with means to pump cooler water from deep beneath the platform and use that water as feed to the snow making devices.

Although it is not intended to limit this invention to any specific theory of operation, it is believed to be likely that the snow making devices installed on a fixed platform will act to extract heat from the moisture surrounding that platform; that the thermal conditions that favor increasing the intensity of a hurricane will be diminished by operating the snow makers installed on those platforms that are in the path of a hurricane; and that this action will increase the effectiveness of the moving platforms (the navigable vessels) that are following in the eye of the hurricane.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
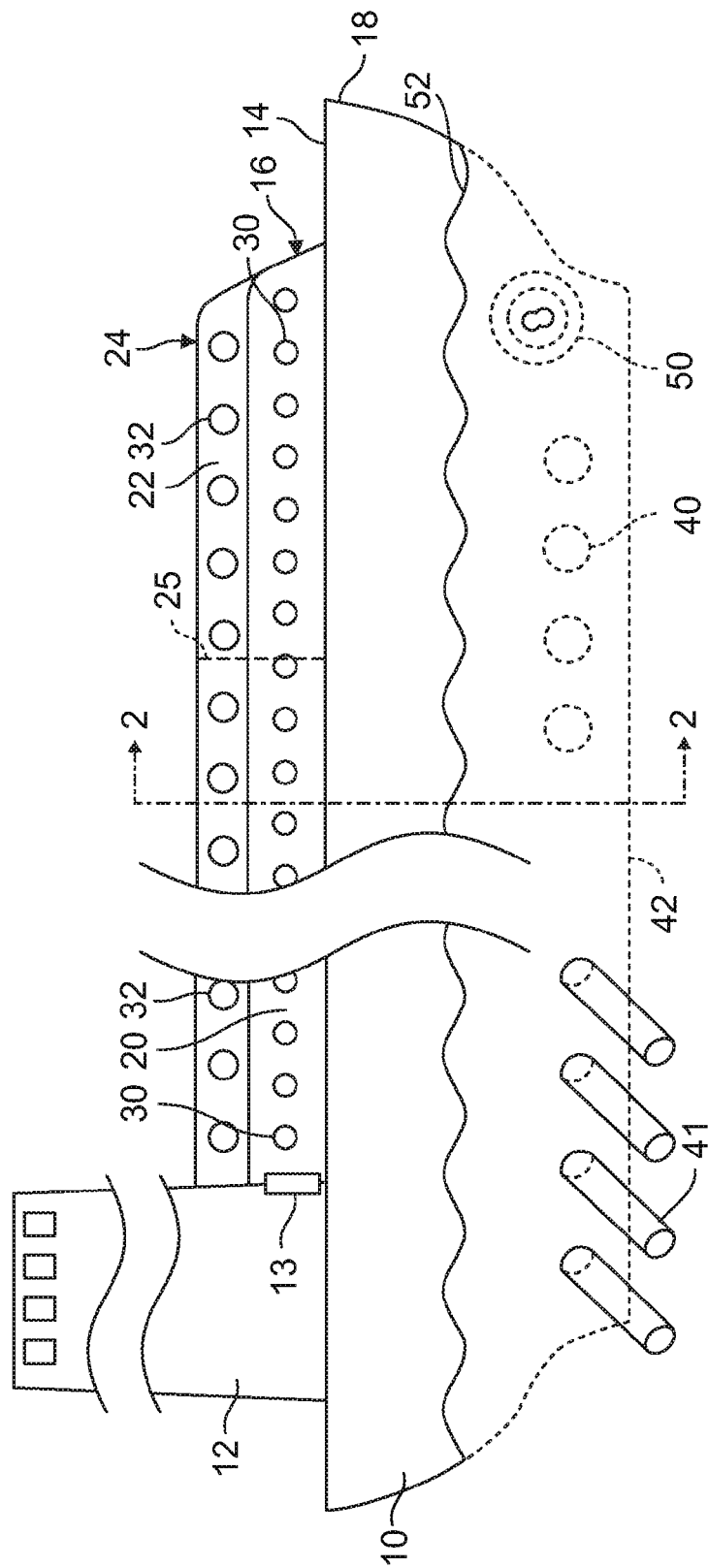
FIG. 1 is a side view of a ship designed to practice the invention.
Figure 2:
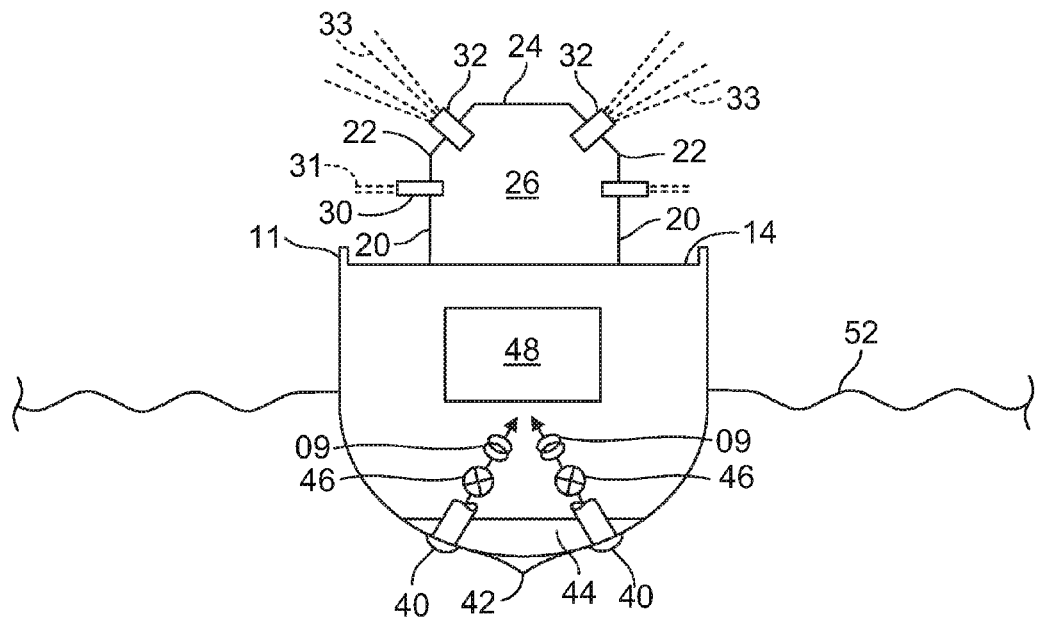
FIG. 2 is a section on line 2-2 in FIG. 1.

In FIGS. 1 and 2 the ship has a hull 10 resembling that of a typical oil tanker, with the bridge, navigation and living spaces in a tower 12 located aft. The main deck 14 supports a superstructure 16 extending from the tower forward toward the bow 18. As seen best in FIG. 2 the superstructure 16 has sidewalls 20 extending substantially vertically from the main deck, followed by inwardly-sloping walls 22 extending upwardly, capped by a substantially horizontal roof wall 24 completing an enclosure for interior space 26. Water nozzles are fixed in and extend through the sidewalls 20 in an array extending the full length of each sidewall. Snow makers 32 are fixed in and extend through the sloping walls 22 in an array extending the full length of each sloping wall. Screened water intakes 40 are fitted in the hull underwater on either side of the keel 42 and extending through the double-bottom 44. Each water intake is fitted with a control valve 46 and a water pump 09. Water intakes 40 extend in arrays along the forward portion of the hull on each side of the keel 42. Water outlets 41 extend along the aft portion of the hull on each side of the keel. Refrigeration equipment 48 is contained within the hull below the main deck 14. A transverse thruster 50 is fitted through the hull below the water line 52. In FIG. 2 a typical snow-maker pattern 33 is shown at each snow maker 32, and a typical water stream pattern 31 is shown at each water nozzle 30. The water nozzles 30 are located in the sidewalls 20 at a level that is above the main deck rails 11, so that the water streams will clear the rails.

Figure 3:
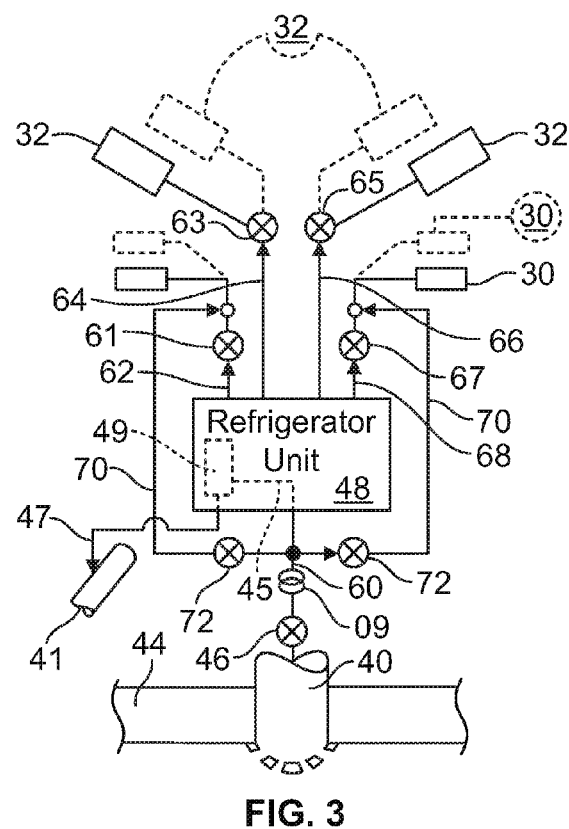
FIG. 3 is an operational schematic showing suggested connections among the elements shown in FIGS. 1 and 2.

In FIG. 3 a line 60 extends from the control valve 46 to the refrigerator unit 48. Four output lines 62, 64, 66 and 68 extend from the refrigerator unit to each of the water nozzles 30 and the snow makers 32, individually. Each output line is fitted with a control valve 61, 63, 65 and 67, respectively. As thus far described the system will provide refrigerated water to all of the water nozzles and snow makers on the ship. There may be several refrigerator units, and each unit may service several snow makers 32 and water nozzles 30, as is suggested in FIG. 3. If desired, the water nozzles 30 may be fed water directly from the water intakes 40 via by-pass lines 70. The bypass lines connect to the line 60 from the control valve 46 through valves 72, respectively. To use the bypass lines 70 valves 72 are opened and valves 61, 67 are closed.

Each refrigerator unit 48 includes a heat exchanger 49. Within the unit 48 some of the intake water is diverted via a line 45 to the heat exchanger and through the heat exchanger to an outlet 41, for removing accumulated heat from the refrigerator unit. The outlets 41 are directed aft and downward to direct the heated water downward toward colder regions of the ocean water behind the ship.

In the process of making artificial snow the snow makers 32 extract latent heat of fusion from the water that is supplied to them. The artificial snow, in turn, extracts heat from the moisture into which it is sprayed by the snow makers. The heat that would otherwise be available to support cyclonic action is thereby diminished. Since snow makers as heretofore used are operated in a cold environment the invention provides water to the snow makers 32 that is refrigerated to a temperature low enough for the snow makers to produce artificial snow. On the other hand, since the surface-water temperature must exceed a known value in order that a cyclone may evolve, it may not be necessary to refrigerate the water that is sprayed on the surface to inhibit formation of a cyclone. The invention provides an option to refrigerate or not refrigerate that water.

Although it is not intended to limit this invention to any specific theory of operation, it is believed to be likely that initially, when the artificial snow is sprayed into the water vapor it will lower the temperature and with it the vapor pressure at a cost not exceeding one calorie per gram (assuming that the water vapor will have a specific heat not greater than that of liquid water), and that cooling of the water vapor will proceed toward the freezing point, where the vapor pressure will approach a vanishing value. This alone will deprive the cyclone of the driving force which it would otherwise derive from an uninterrupted rising volume of warm water vapor that condenses in the upper atmosphere. Should this expected scenario fail to materialize, or be insufficient to reduce the intensity of the cyclone, the invention provides the resources to condense the water vapor into liquid state, by continued application of artificial snow, and, separately, by applying cooling water from the water nozzles 30 to cool the surface water.

To gain maximum effectiveness the ship must hold station in the eye of a cyclone. This requirement limits the speed of advance to the speed at which the storm is advancing, which may be a very low speed. It is difficult for ships to maintain a desired heading when advancing at very low speeds because the rudder loses control at very low speeds. The bow thruster 50 is useful to compensate for this loss of control.

The interior space 26 within the superstructure 16 provides a gallery in which the water feed lines and valves shown in FIG. 3 can be supported, along with all necessary electrical and other support systems. The systems may include the electric motors and compressed air facilities that are normally supplied with snow making nozzles. Crewmembers who operate and maintain the equipment can be stationed in this gallery, safe from external hostile weather elements. A watertight door 13 is provided between the tower 12 and the gallery space 26, giving crewmembers access to the gallery that does not require going out of protected space. The enclosed gallery space 26 allows service pipes and electrical conductors to be passed through the main deck 14 within the enclosed space; there is no need to perforate the main deck outside of that space. Watertight integrity can be enhanced by providing one or more bulkheads 25 across the gallery space; such bulkheads, if provided, will include watertight doors (not shown).

As used herein, the term 'artificial snow' includes any solid form of water regardless of whether it is an ice crystal or an ice particle and regardless of whether it is in the form of single crystals or particles or an agglomeration of multiple crystals or particles.

It is contemplated that in use a plurality of ships will be deployed in the water beneath the cyclonic eye to cooperate in the effort to deprive the cyclone of its driving force.

Figure 4:
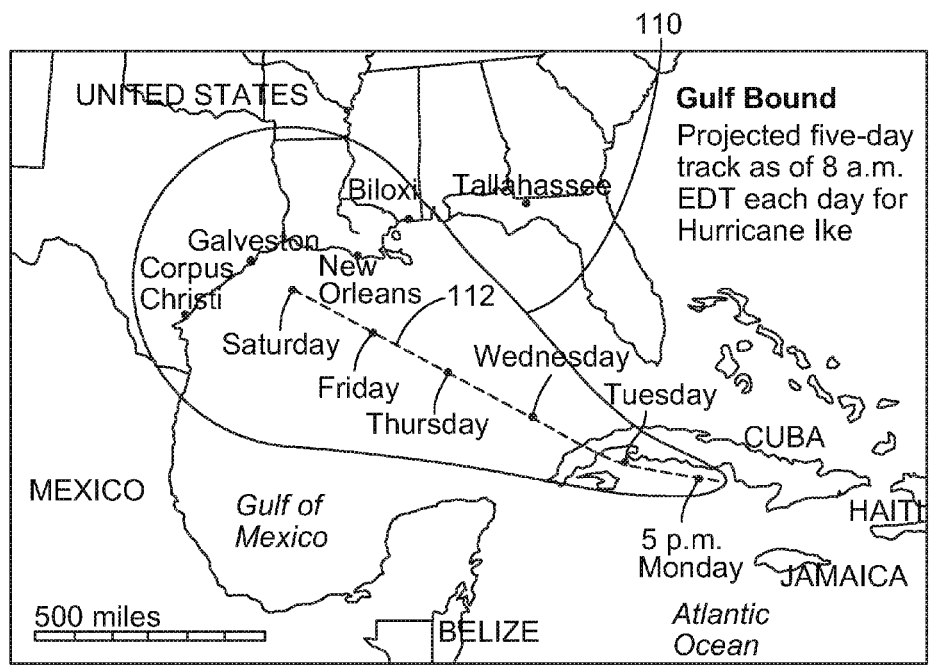
FIG. 4 is a copy of a published illustration showing the projected path of Hurricane Ike entering the Gulf of Mexico.

In FIG. 4 the projected path 112 of the hurricane is within an envelope 110. At its western end this envelope crosses the coastal regions of three states, Texas, Louisiana and Mississippi. Many drilling platforms (not shown) are located in the waters in the approaches to these coastal regions. As FIG. 4 shows, hurricane Ike moved at a speed of advance that took it approximately six days to traverse its path from Cuba to these coastal regions. To illustrate this invention, the invention proposes to fit snow making devices to the fixed platforms located in the approaches to these coastal regions, and to operate those devices in a manner that takes advantage of the time interval between entry of a hurricane into the Gulf and its arrival in these coastal regions.

Figure 5:
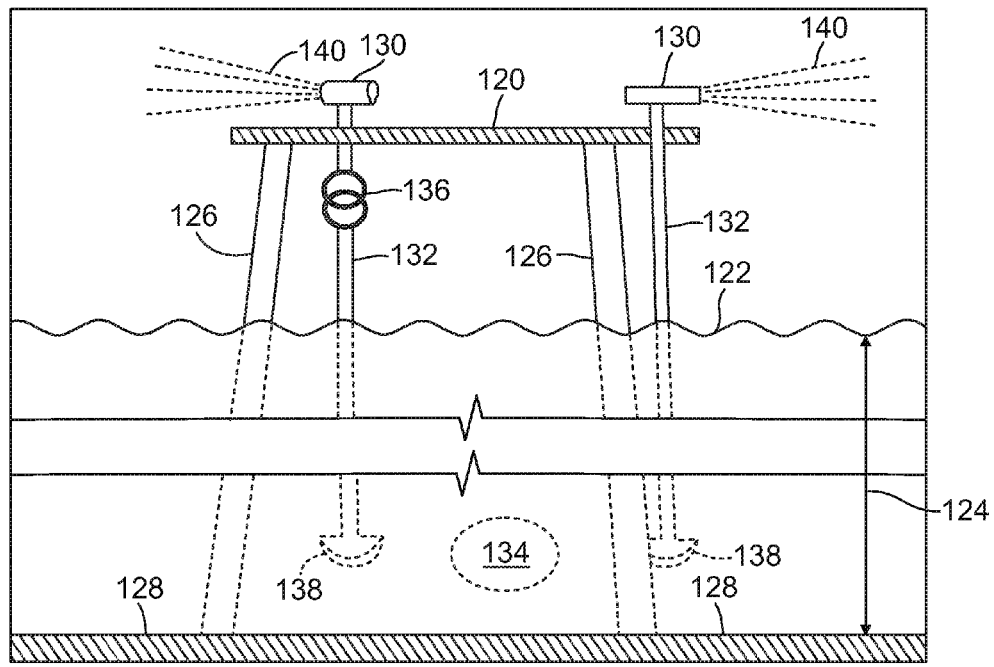
FIG. 5 is a schematic drawing illustrating the application of the invention to a platform fixed in an ocean location.

Referring now to FIG. 5, a platform 120 is fixed above the surface 122 of ocean water 124 on supports 126 extending to the ocean bottom 128. Snow making devices 130 are supported on rigid conduits 132 which are fixed to and extend through the platform 120 to a lower region 134 of the ocean, where the temperature of the water is lower than the water temperature at the surface 122. Each conduit 132 may have a pump 136 (shown in only one conduit) to draw water from the lower region 134 and feed that cooler water under pressure to the snow making devices 130. Each conduit is fitted with a strainer 138 at its lower end to prevent the ingestion of debris from the bottom 128.

When fed water at a low temperature snow making devices can generate clouds 140 of artificial snow. In warm or topical climates it is useful, sometimes necessary, to refrigerate the feed water to achieve efficient production of artificial snow. Drawing feed water from the lower ocean depths 134, as is taught in the present invention, diminishes the need to cool the feed water. This novel technique can be employed using rigid conduits as shown herein or flexible conduits (not shown).

A preferred mode of practicing the invention is to commence operating snow making machines aboard several of the drilling platforms in the projected path of a tropical cyclone when the approaching cyclone is still some distance away and moving platforms are already at work in the eye of the storm. In this mode, when the moving platforms, which will have done all that of which they are capable, arrive closer to landfall they will encounter a region in which the tendency of moisture to rise will already have been somewhat repressed, the combined efforts of the moving and the fixed platforms will yield a less furious landfall than would the efforts of the moving platforms acting alone.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for reducing the wind force of a tropical cyclone having an eye that is moving toward landfall in a predictable path, said method comprising operating in the water under said eye at least one mechanism moving with said eye that is operable to provide a coolant to reduce the heat that is available to said cyclone from said water, controlling said mechanism to provide said coolant continually while said mechanism is moving toward landfall in said path and to dispense said coolant in a continual stream over said water, and operating in a fixed location in said path at least one additional mechanism that is operable to provide an additional coolant to reduce the heat that will be available to said cyclone upon reaching said location.

2. A method according to claim 1 in which at least one of said mechanisms is a device that when operated makes artificial snow.

3. A method according to claim 1 in which each of said mechanisms is a device that when operated makes artificial snow.

4. A method of reducing the wind force of a tropical cyclone having an eye moving in a path over an ocean region that is populated with fixed-location drilling platforms including some platforms that are in said path, from which ocean moisture is arising, said method comprising continually producing in at least one station located on said ocean beneath said eye and moving in said path therewith a substantially uninterrupted supply of a coolant and directing said coolant as it is produced into said moisture located beneath said eye, and as said eye approaches each of said platforms that are in said path producing on said each platform an additional supply of coolant and directing said coolant into said moisture surrounding said each platform.

5. A method according to claim 4 in which said coolant is artificial snow.

6. A method for reducing the wind force of a developed tropical cyclone that has an eye and is moving over water in a predicted path toward landfall, said method comprising operating on the surface of said water under said eye a navigable vessel that is armed with a plurality of devices that provide a coolant when operated and control instruments for said devices, controlling said vessel to follow said hurricane under its eye toward landfall, and operating said devices to provide a continual supply of said coolant substantially without interruption while said vessel is following said hurricane under its eye, and as said supply is being provided operating said devices to project said supply away from said vessel over the surface of said water surrounding said vessel.

7. A method according to claim 6 in which said devices make artificial snow when they are operated.

8. A method of suppressing the wind-induced heat exchange of a developed tropical cyclone that has an eye and is moving over water in a predicted path toward landfall over an ocean region that is populated with offshore drilling platforms that relative to said cyclone are permanently fixed in respective locations in said region, which ocean region includes forward components of said predicted path, said method comprising operating on the surface of said water under said eye a navigable vessel that is armed with a plurality of devices that provide a coolant when operated and control instruments for said devices, controlling said vessel to follow said hurricane under its eye toward landfall, operating said devices to provide a continual supply of said coolant substantially without interruption while said vessel is following said hurricane under its eye, as said supply is being provided operating said devices to project said supply away from said vessel over the surface of said water surrounding said vessel, arming some of said permanently fixed offshore platforms with additional devices that provide additional coolant when operated and control instruments for said additional devices, and as said cyclone enters the vicinity of one of said armed offshore platforms operating at least one additional device thereon so as to add its additional coolant to said supply in said vicinity.

9. A method according to claim 8 employing artificial snow as coolant.

* * * * *